(12) United States Patent
Hamamoto

(10) Patent No.: US 6,965,409 B1
(45) Date of Patent: Nov. 15, 2005

(54) IMAGE INPUT APPARATUS HAVING PHOTOELECTRIC CONVERSION DEVICES BONDED TO A LIGHT GUIDE MEMBER

(75) Inventor: Osamu Hamamoto, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/501,589

(22) Filed: Feb. 10, 2000

(30) Foreign Application Priority Data

Feb. 17, 1999 (JP) ................................. 11-038441

(51) Int. Cl.[7] ......................... H04N 5/225; H04N 7/18; G02B 6/04; G01N 23/04
(52) U.S. Cl. ........................ 348/340; 348/77; 385/120; 378/62
(58) Field of Search ........................ 385/115, 116, 117, 385/118, 119, 120, 121; 250/370.09, 370.11, 250/368; 378/62, 63, 98.8; 348/77, 340, 348/294

(56) References Cited

U.S. PATENT DOCUMENTS

| | | | | |
|---|---|---|---|---|
| 3,639,806 A | * | 2/1972 | Requa ......................... | 345/81 |
| 4,233,506 A | * | 11/1980 | Yamamoto et al. .... | 250/227.11 |
| 4,799,050 A | * | 1/1989 | Prince et al. .................. | 349/71 |
| 4,900,930 A | | 2/1990 | Takiguchi et al. ........... | 250/361 |
| 4,978,195 A | | 12/1990 | Takano et al. ........... | 350/96.27 |
| 5,032,718 A | * | 7/1991 | Murakami ................ | 250/227.2 |
| 5,101,285 A | | 3/1992 | Kawai et al. ................ | 358/471 |
| 5,464,984 A | * | 11/1995 | Cox et al. ............... | 250/370.11 |
| 5,526,141 A | | 6/1996 | Ogura et al. ................ | 358/496 |
| 5,572,034 A | * | 11/1996 | Karellas ...................... | 250/368 |
| 5,629,524 A | * | 5/1997 | Stettner et al. ........ | 250/370.09 |
| 5,638,469 A | | 6/1997 | Feldman et al. .............. | 385/14 |
| 5,739,542 A | | 4/1998 | Sudo et al. .............. | 250/483.1 |
| 5,912,465 A | | 6/1999 | Kobayashi et al. ...... | 250/370.9 |
| 6,042,267 A | * | 3/2000 | Muraki et al. .............. | 378/169 |
| 6,091,070 A | * | 7/2000 | Lingren et al. ........ | 250/370.09 |
| 6,137,535 A | * | 10/2000 | Meyers ........................ | 348/340 |

FOREIGN PATENT DOCUMENTS

| | | |
|---|---|---|
| GB | 2 101 150 A | 10/1981 |
| JP | 09153606 | 6/1997 |
| JP | 10221456 | 8/1998 |
| JP | 10282243 | 10/1998 |

* cited by examiner

Primary Examiner—Wendy R. Garber
Assistant Examiner—Justin Misleh
(74) Attorney, Agent, or Firm—Fitzpatrick, Cella, Harper & Scinto

(57) ABSTRACT

In order to satisfy all requirements for an apparatus, namely performance associated with high resolution and moving images, wide sensor effective area, and reductions in the size and cost of the apparatus, the apparatus includes a plurality of photoelectric conversion devices respectively having photoelectric conversion areas, and a light guide plate for guiding incident light to each photoelectric conversion device. Transmitting portions for driving the photoelectric conversion devices or/and connecting portions for connecting the photoelectric conversion devices so as to transmit electrical signals between the photoelectric conversion devices are formed on the light guide plate.

12 Claims, 4 Drawing Sheets

IMAGE INPUT APPARATUS HAVING PHOTOELECTRIC CONVERSION DEVICES BONDED TO A LIGHT GUIDE MEMBER

BACKGROUND OF THE INVENTION

1. Field of the Invention

The present invention relates to an image input apparatus and system which sense an object image by dividing it into a plurality of photoelectric conversion areas.

2. Related Background Art

X-ray photography for medical diagnostic purposes is often performed by using a film screen system that uses a combination of sensitized paper and an X-ray photographic film.

According to this method, X-rays passing through an object contains information inside the object body, and the information is converted into visible light proportional to the intensity of the X-rays by the sensitized paper. As a consequence, the X-ray film is exposed to the visible light.

Recently, an X-ray digital image sensing apparatus has been used, which converts X-rays into visible light proportional to the intensity of the X-rays by using phosphors, converts the light into an electrical signal by using photoelectric conversion devices including a photoelectric conversion area that is formed by a single semiconductor substrate, and converts the signal into a digital signal through an A/D converter.

For example, the following X-ray digital image sensing apparatuses have been proposed: an apparatus in which phosphors for converting X-rays into visible light are stacked on a matrix of photoelectric conversion devices, each having electrodes sandwiching an amorphous semiconductor element, on a glass substrate; and an apparatus comprised of a two-dimensional array of modules each formed by arranging photoelectric conversion devices such as CCDs on the tapered side of a tapered optical fiber bundle softened and extended by heat and stacking a phosphor on the opposite side of the fiber bundle to the photoelectric conversion devices.

The above X-ray digital image sensing apparatuses are mainly used for medical diagnosis and the like. For early detection of abnormal portions and accurate diagnosis, there have been increasing demands for high resolution, low noise, moving images, wide image sensing areas, and the like.

The following problems are, however, posed in the above conventional X-ray digital image sensing apparatuses.

According to the apparatus using the photoelectric conversion devices formed from the semiconductor elements made of amorphous silicon or the like on the glass substrate, although a large sensor effective size can be attained, a reduction in pixel size is difficult to achieve in terms of process and device characteristics.

According to the apparatus using the photoelectric conversion devices such as CCDs formed on the silicon substrate, a reduction in pixel size can be achieved, and moving images can be obtained because the apparatus has high sensitivity and can be driven at high speed. However, a large sensor effective area cannot be set owing to process limitations.

Under the circumstances, there is proposed an apparatus designed to increase the sensor effective area by increasing the number of photoelectric conversion devices using optical fibers tapered to prevent the non-sensor areas of the elements from overlapping, as shown in FIG. 1. Referring to FIG. 1, this apparatus is comprised of photoelectric conversion devices 1 including photoelectric conversion areas, a scintillator 2 for converting X-rays into light such as visible light having a wavelength that can be detected in the photoelectric conversion areas, tapered optical fibers 8, protective glass plates 10, bonding wires 11, and ceramic packages 12. However, these tapered optical fibers are expensive, thick, and heavy. This makes it impractical to obtain a sensor effective area required for chest photography, even though several such optical fibers can be coupled to each other.

Owing to these problems, it is difficult to satisfy all the requirements for an X-ray digital image sensing apparatus for medical diagnosis, namely performance associated with high resolution and moving images, wide sensor effective area, and reductions in the size and cost of the apparatus.

SUMMARY OF THE INVENTION

It is an object of the present invention to provide an image input apparatus which satisfies the two requirements, i.e., a wide sensor effective area and a reduction in apparatus size, and an image input system using the image input apparatus.

In order to achieve the above object, according to an aspect of the present invention, there is provided an image input apparatus comprising:

a plurality of photoelectric conversion devices respectively including photoelectric conversion areas; and a light guide member for guiding light to be incident on the photoelectric conversion area included in each of the photoelectric conversion devices, wherein the light guide member includes connection means for connecting the plurality of photoelectric conversion devices so as to transmit an electrical signal between the plurality of photoelectric conversion devices.

According to another aspect, there is provided an image input apparatus comprising:

a plurality of photoelectric conversion devices respectively including photoelectric conversion areas; and a light guide member for guiding light to be incident on the photoelectric conversion area included in each of the photoelectric conversion devices, wherein the light guide member includes transmission means for sending to the semiconductor substrate, an electrical signal for driving the photoelectric conversion area.

According to still another aspect, there is provided an image input apparatus comprising:

a plurality of photoelectric conversion devices respectively including photoelectric conversion areas;

a light guide member for guiding light to be incident on the photoelectric conversion area included in each of the photoelectric conversion devices, wherein the light guide member includes connection means for connecting the plurality of photoelectric conversion devices so as to transmit an electrical signal between the plurality of photoelectric conversion devices;

image processing means for processing an image signal output from the photoelectric conversion device; and display means for displaying the signal from the image processing means.

According to still another aspect, there is provided an image input apparatus comprising:

a plurality of photoelectric conversion devices respectively including photoelectric conversion areas;

a light guide member for guiding light to be incident on the photoelectric conversion area included in each of the photoelectric conversion devices, wherein the light guide member includes transmission means for transmitting an electrical signal for driving the photoelectric conversion area to the semiconductor substrate;

image processing means for processing an image signal output from the photoelectric conversion device; and display means for displaying the signal from the image processing means.

The above and other objects, features, and advantages of the present invention will be apparent from the following detailed description in conjunction with the accompanying drawings.

DETAILED DESCRIPTION OF THE PREFERRED EMBODIMENT

An embodiment of the present invention will be described below. Although an image input apparatus of the present invention can be suitably used for X-ray image sensing, its application is not limited to X-ray image sensing.

Figure 1:
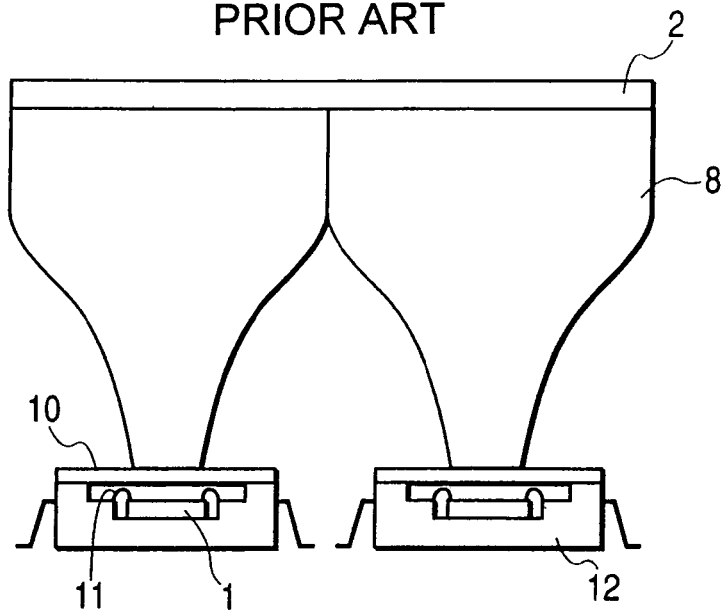
FIG. 1 is a sectional view of the structure of a conventional X-ray image sensing apparatus.
Figure 2:
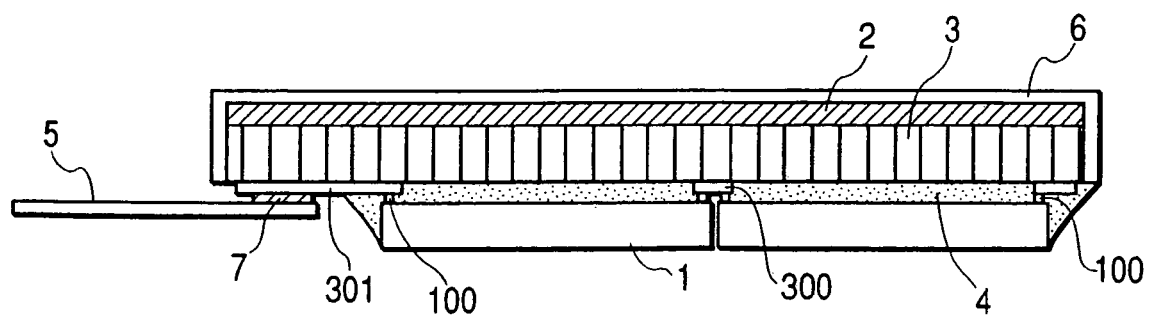
FIG. 2 is a sectional view of the structure of an X-ray image input apparatus according to an embodiment of the present invention.
Figure 3:
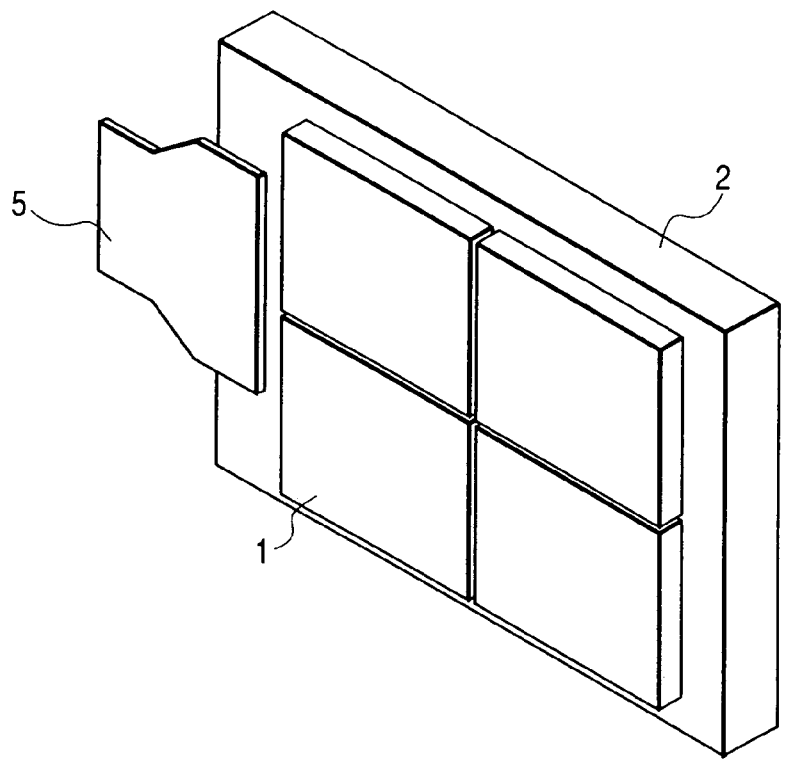
FIG. 3 is a perspective view of the X-ray image input apparatus according to the embodiment of the present invention.

FIG. 2 is a sectional view of the X-ray image input apparatus according to the present invention. FIG. 3 is a perspective view of this apparatus.

Referring to FIG. 2, this apparatus is comprised of a plurality of photoelectric conversion devices 1 respectively including photoelectric conversion area that is formed by a single semiconductor substrate, stud bumps 100 formed on connection terminals on the photoelectric conversion devices 1, a scintillator 2 for converting X-ray into light (e.g., visible light) having a wavelength that can be detected in the photoelectric conversion areas, an optical fiber plate 3 as a light guide member for guiding the light to the photoelectric conversion devices without dispersion, a transparent adhesive 4, an FPC (Flexible Printed Circuit) 5, a scintillator protective resin 6, an anisotropic conductive adhesive 7, connecting portions 300 including terminals and interconnections for connecting the adjacent photoelectric conversion devices to each other, and transmitting portions 301 including terminals and interconnections for connecting the FPC 5 to the photoelectric conversion devices and transmitting a power supply voltage or the like to drive the photoelectric conversion areas. In this embodiment, the four photoelectric conversion devices are arranged. Obviously, however, the present embodiment can be applied to an arrangement having two or more photoelectric conversion devices and is not limited to the arrangement having four photoelectric conversion devices. The photoelectric conversion areas can be formed either on the surface on the scintillator side (stud bump side) or on the surface on the opposite side to the scintillator.

The optical fiber plate 3 is formed by heat-pressing a bundle of a plurality of optical fibers each having a diameter of about 5 to 6 $\mu$m, and cutting the resultant structure into plates. After the cutting, a plurality of plates, each having an area of 50×50 mm and a thickness of about 3 mm, are abutted and heated/bonded to each other, thereby forming a large optical fiber plate. Thereafter, the fiber plate is polished to eliminate the differences in thickness between the respective plates.

Transmitting portions 301 and connecting portions 300 are also formed in advance on the optical fiber plate 3 for the respective photoelectric conversion devices 1 by a photo-etching process. Pure aluminum layers are formed by sputtering, vapor deposition, or the like to form terminals and interconnections in accordance with the photoelectric conversion devices 1 to be mounted. The connection stability can be improved by stacking a 100-Å thick palladium layer, 0.1-$\mu$m thick nickel layer, and 0.3-$\mu$m thick gold layer on the aluminum terminals by electroless plating.

Figure 4:
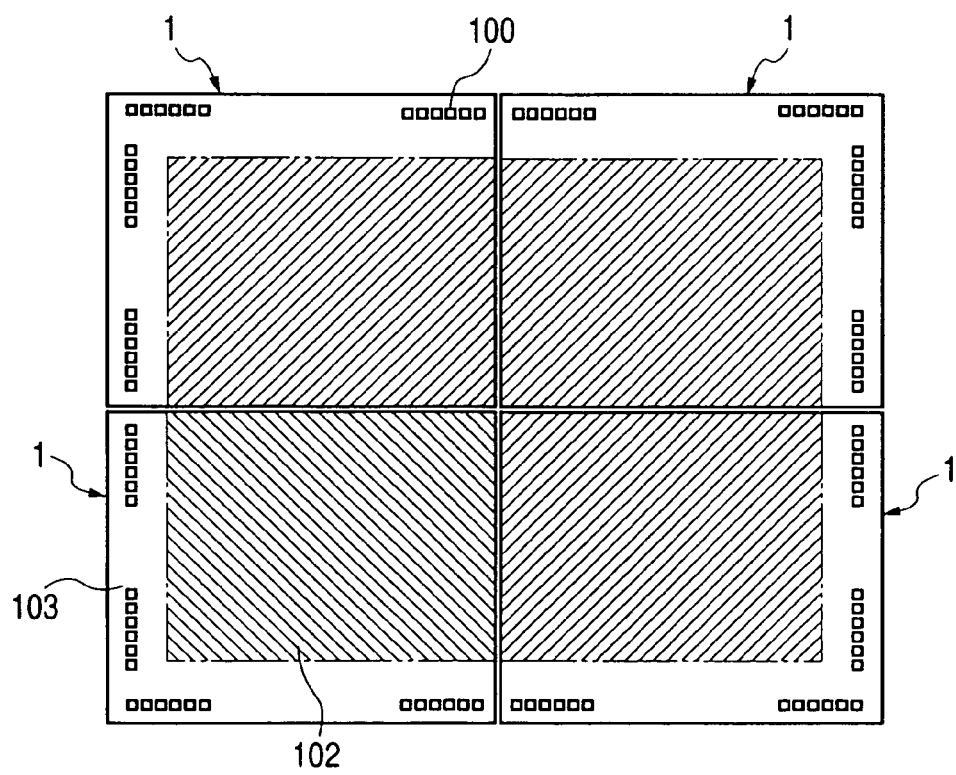
FIG. 4 is a plan view showing the layout of the photoelectric conversion devices of the image input apparatus according to the embodiment of the present invention.

Subsequently, as shown in FIG. 4, the bumps 100 for connection are formed on the terminals on the photoelectric conversion devices 1. Assume that stud bumps are used such that only ball portions of the boding wires are bonded to the terminals. In this case, after the ball portions are bonded by ultrasonic waves and heat, the recrystallized portions of the cut wires are left to become short projections, causing inconvenience to joining to the photoelectric conversion devices. For this reason, the upper surfaces of the bumps are pressed down by flattening. The bumps 100 are coated with a silver paste by a transfer method in advance to ensure connection reliability.

On the optical fiber plate 3 on which the transmitting portions 301 and connecting portions 300 are formed, an adhesive is dropped on the central portion of a portion on which the photoelectric conversion devices 1 are to be bonded, and the photoelectric conversion devices 1 are positioned and temporarily fastened by contact bonding such that the bumps 100 are connected to the connecting portions 300 and transmitting portions 301. Note that this adhesive is a so-called under-fill agent, and a mixture of silica and a transparent epoxy resin which is high in curing shrinkage and low in thermal expansion coefficient is used as this adhesive.

When this operation is repeated by the number of times corresponding to the number of photoelectric conversion devices to be used, and all the photoelectric conversion devices to be mounted are temporarily fastened by contact bonding, they are fixed by contact bonding.

FIG. 4 shows the layout of the structure using four photoelectric conversion devices. The bumps 100 are formed on the electrodes on the photoelectric conversion devices 1. Hatched portions 102 are photoelectric conversion areas in which pixels including photodiodes and the like are arranged in the form of a matrix, Areas 103 include driving circuits for driving the photoelectric conversion areas, signal processing circuits, and mounting areas.

As shown in FIG. 4, certain gaps must be ensured between the photoelectric conversion devices 1 owing to cutting variations of the substrate, positioning variations, and the like. In this case, the photoelectric conversion devices 1 are bonded with 50-μm gaps. Since the pixel pitch of the photoelectric conversion devices 1 is 50 μm, each gap corresponds to a loss of one pixel. However, data can be interpolated by pixel data adjacent to both side of the gap respectively to compensate for a corresponding data loss. This interpolating processing is performed by an image processor 6070 (FIG. 6) to be described later.

Figure 5:
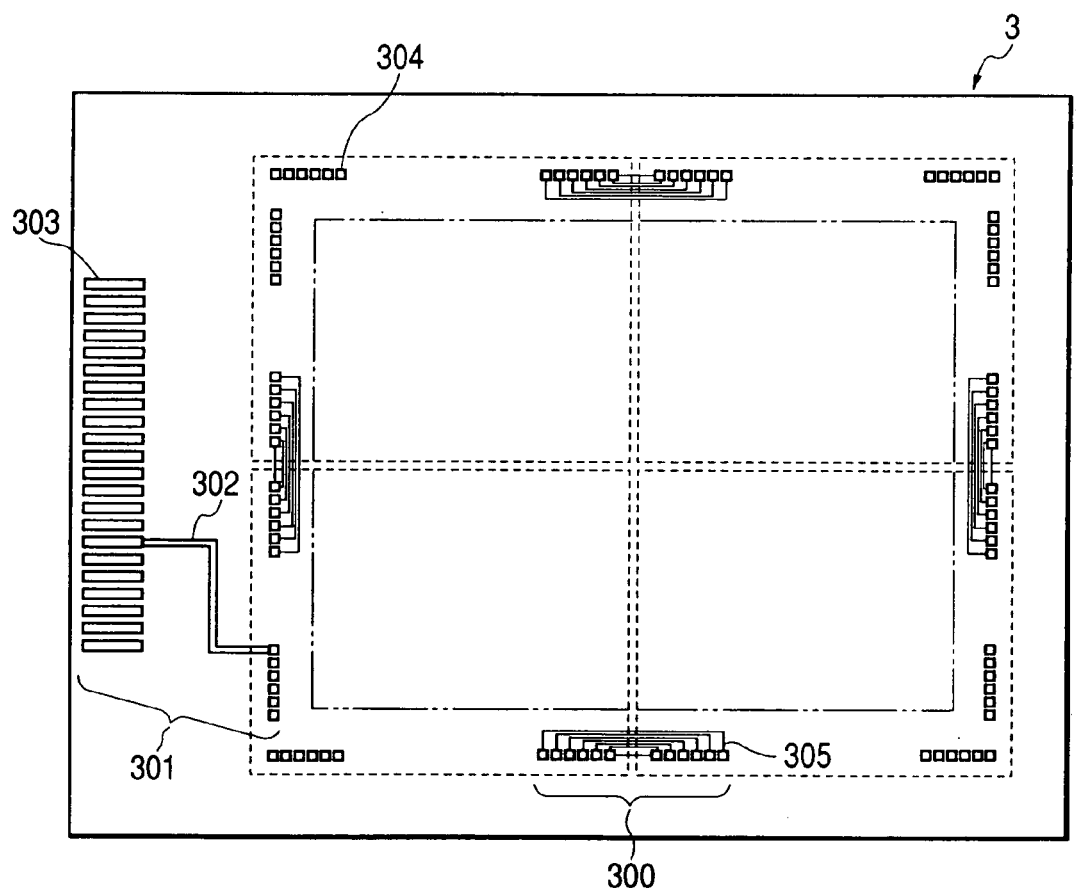
FIG. 5 is a plan view showing the layout of interconnections and terminals on the optical fiber plate of the image input apparatus according to the embodiment of the present invention.

FIG. 5 is a plan view showing the optical fiber plate. For the sake of simplicity, FIG. 5 shows only one interconnection 302. In practice, however, terminals 303 and 304 are connected to each other through interconnections (not shown). The terminals 304 are used for connection to the photoelectric conversion devices 1 and formed to correspond to the bumps 100 on the photoelectric conversion devices 1. The terminals 303 are formed for connection to the FPC 5.

The transmitting portions 301 made up of the terminals 303 and 304 and interconnections 302 are used to transmit power supply voltages to the photoelectric conversion devices 1 through the FPC 5 and transmit control signals such as a control signal for control of read-out of signals from the photoelectric conversion devices 1. The transmitting portions 301 also serve as transmission paths for outputting signals from the photoelectric conversion devices 1.

The connecting portions 300 made up of the terminals 304 and interconnections 305 serve as transmission paths for power supply voltages, transmission paths for control signals, transmission paths for signals from the photoelectric conversion devices 1, and the like.

Note that the interconnections 302 may be formed on the photoelectric conversion devices 1 to directly connect the connection terminals of the photoelectric conversion devices 1 to the connection terminals 301 of the optical fiber plate.

Photoelectric conversion devices are formed on a silicon wafer, and the wafer is cut by a dicer. In this case, high cutting precision is required for sides to which the photoelectric conversion devices adjoin.

Heating conditions for contact bonding are set as follows. Curing conditions for a resin component are, for example, a temperature of 150° C. with a curing time of 80 sec. Although a pressure condition varies depending on the number of terminals, an appropriate load is set on the apparatus side to apply a pressure of 70 to 120 g per terminal.

In contact bonding, a special heater tool capable of simultaneously contact-bonding all the photoelectric conversion devices by using independent heater beds is used to absorb variations in level among the photoelectric conversion devices 1 and variations in level among the bumps 100. Alternatively, an integral heater tool may be used with a buffer member for absorbing variations.

The FPC 5 for supplying external power supply voltages and inputting/outputting signals through the interconnections 302 on the optical fiber plate 3 is subjected to thermal contact bonding. In addition, the resultant structure is sealed with a resin to protect the terminals and element portions.

A phosphor or phosphor film serving as a scintillator for converting X-rays into light is stacked on the opposite side of the optical fiber plate 3 to the side on which the terminals, electrodes, and interconnections are formed.

As a phosphor material, cesium iodide (CsI) or gadolinium sulfide ($Gd_2O_2S_2$) is used and deposited by vapor deposition. Since the deposition layer may be damaged by contacting or dissolved by moisture, the layer is protected by the moisture penetration preventing resin 6 or the like.

Alternatively, a film-like member may be formed by mixing a gadolinium sulfide powder and binder and bonded to the optical fiber plate 3 with an adhesive.

Figure 6:
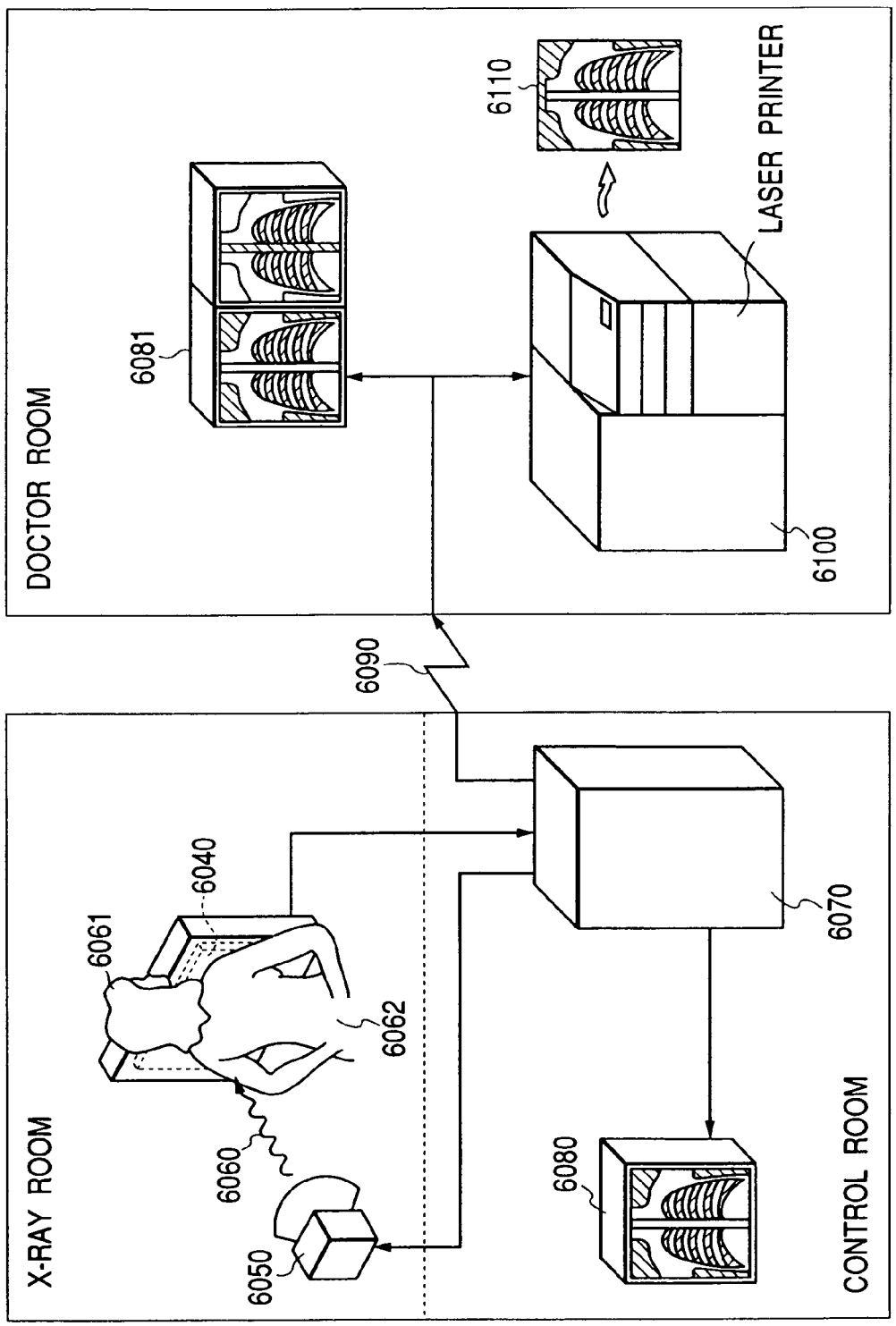
FIG. 6 is a schematic view showing a practical example of an image processing system (X-ray diagnosis system) using the image input apparatus according to the embodiment of the present invention.

FIG. 6 is a schematic view showing a practical example of an image processing system (X-ray diagnosis system) using the image input apparatus described above.

X-rays 6060 generated by an X-ray tube 6050 are transmitted through a chest 6062 of a patient or object 6061 and incident on an image input apparatus 6040 having a scintillator mounted thereon. The incident X-rays contain information about the interior of the object 6061. The scintillator emits light in accordance with the incidence of the X-rays. This light is photoelectrically converted into electrical information. This information is converted into digital information and subjected to image processing in an image processor 6070. The resultant image can be observed on a display 6080 in a control room.

In addition, this information can be transferred to a remote place through a transmission means such as a telephone line 6090, and hence can be displayed on a display 6081 in a doctor room in another place or stored in a storage means. This allows a doctor in a remote place to perform diagnosis. Furthermore, the information can be recorded on a film 6110 by a film processor 6100.

As has been described above, according to this embodiment, the following technological advantages can be obtained.

(1) Since a plurality of photoelectric conversion devices having photoelectric conversion areas are arranged on a light guide plate such as an optical fiber plate, an image input apparatus having a high-resolution, high-sensitivity, low-profile and a wide sensor effective area can be provided.

(2) A further reduction in the size of the apparatus can be attained by mounting driving ICs for driving the photoelectric conversion areas of the photoelectric conversion devices and the signal processing ICs on the optical fiber plate on which the photoelectric conversion devices are formed.

(3) Since the optical fibers are made of a material containing lead and X-rays that are not converted into light by the scintillator are blocked by the lead, the influences of X-rays on the photoelectric conversion devices can be reduced, thus obtaining images without noise.

(4) All the requirements for an X-ray digital input apparatus for medical diagnosis, namely the performance associated with high resolution and moving images, wide sensor effective area, and reductions in the size and cost of the apparatus, can be satisfied, and hence an X-ray image input apparatus that can be satisfactorily used for high-precision medical practice can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image input apparatus comprising:
   a plurality of photoelectric conversion devices each of which includes a two-dimensional array of photoelectric conversion areas; and
   a light guide member for guiding light to be incident on the two-dimensional array of the photoelectric conversion areas of said plurality of photoelectric conversion devices,
   wherein said light guide member includes a connection member for electrically connecting said plurality of photoelectric conversion devices with each other to transmit an electrical signal between said plurality of photoelectric conversion devices, and wherein the plurality of photoelectric conversion devices are bonded to the light guide member using adhesive.

2. An apparatus according to claim 1, wherein said connection member includes a terminal and an interconnection.

3. An apparatus according to claim 1, wherein the electrical signal includes a power supply voltage for driving the photoelectric conversion area.

4. An apparatus according to claim 1, wherein the electrical signal includes a control signal for driving the photoelectric conversion area.

5. An apparatus according to claim 1, wherein said photoelectric conversion device includes a driving circuit which drives the photoelectric conversion area.

6. An image input apparatus comprising:
   a plurality of photoelectric conversion devices each of which includes a two-dimensional array of photoelectric conversion areas; and
   a light guide member for guiding light to be incident on the two-dimensional array of photoelectric conversion areas of said plurality of photoelectric conversion devices,
   wherein said light guide member includes a transmission member for electrically connecting said photoelectric conversion devices with each other to transmit an electrical signal for driving the photoelectric conversion areas of the photoelectric conversion devices, and
   wherein the plurality of photoelectric conversion devices are bonded to the light guide member using adhesive.

7. An apparatus according to claim 6, wherein said transmission member includes a terminal and an interconnection.

8. An apparatus according to claim 6, wherein the electrical signal includes a power supply voltage.

9. An apparatus according to claim 6, wherein the electrical signal includes a control signal.

10. An apparatus according to claim 6, wherein said photoelectric conversion device includes a driving circuit which drives the photoelectric conversion area.

11. An image input system comprising:
   a plurality of photoelectric conversion devices each of which includes a two-dimensional array of photoelectric conversion areas;
   a light guide member for guiding light to be incident on the two-dimensional array of the photoelectric conversion areas of said plurality of photoelectric conversion devices, said light guide member includes a connection member for electrically connecting said plurality of photoelectric conversion devices with each other to transmit an electrical signal between said plurality of photoelectric conversion devices, and
   wherein the plurality of photoelectric conversion devices are bonded to the light guide member using adhesive;
   an image processing circuit which processes an image signal output from said photoelectric conversion device; and
   a display device which displays the signal from said image processing circuit.

12. An image input system comprising:
   a plurality of photoelectric conversion devices each of which includes a two-dimensional array of photoelectric conversion areas;
   a light guide member for guiding light to be incident on the two-dimensional array of the photoelectric conversion areas of said plurality of photoelectric conversion devices, said light guide member including a transmission member for electrically connecting said photoelectric conversion devices with each other to transmit an electrical signal for driving the photoelectric conversion areas of the photoelectric conversion devices, and
   wherein the plurality of photoelectric conversion devices are bonded to the light guide member using adhesive;
   an image processing circuit which processes an image signal output from said photoelectric conversion device; and
   a display device which displays the signal from said image processing circuit.

\* \* \* \* \*